United States Patent
Alinari

[11] 3,868,853
[45] Mar. 4, 1975

[54] CASING FOR LIQUID-FILLED DEPTH GAUGE

[76] Inventor: Carlo Alinari, Corso Vittorio Emanuele 200, Turin, Italy

[22] Filed: July 7, 1972

[21] Appl. No.: 269,675

[52] U.S. Cl. ............... 73/300, 73/418, 73/431, G01d/11/24
[51] Int. Cl. ............................................. G01f 23/14
[58] Field of Search ............ 73/431, 416, 300, 406, 73/418; 220/82 R; 58/88 R

[56] References Cited
UNITED STATES PATENTS

| | | | |
|---|---|---|---|
| 2,695,776 | 11/1954 | Burg | 73/430 X |
| 3,187,572 | 6/1965 | Harland | 73/300 X |
| 3,203,244 | 8/1965 | Alinari | 73/300 |
| 3,285,418 | 11/1966 | Miller | 73/431 X |
| 3,341,048 | 9/1967 | Carbone | 220/82 R |
| 3,357,394 | 12/1967 | Ingham et al. | 73/431 X |
| 3,445,801 | 5/1969 | Sattler | 73/406 X |
| 3,605,498 | 9/1971 | Lamb | 73/431 |
| 3,693,446 | 9/1972 | MacMel | 73/300 |
| 3,765,249 | 10/1973 | Bissell | 73/431 |

Primary Examiner—Richard C. Queisser
Assistant Examiner—Daniel M. Yasich
Attorney, Agent, or Firm—Sughrue, Rothwell, Mion, Zinn and Macpeak

[57] ABSTRACT

According to this invention an improved casing for a liquid-filled depth-gauge consists of a sealed capsule formed by two elements of transparent flexible plastics, bonded together, for example by fusion, along abutting outer edges. The two elements may comprise identical shells, or a single shell with a plastics cover.

5 Claims, 9 Drawing Figures

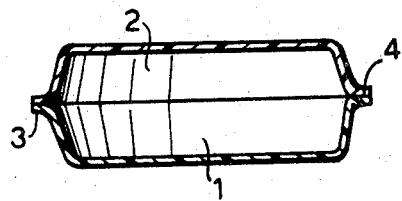
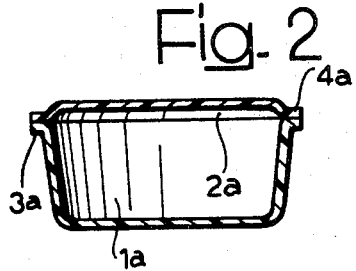
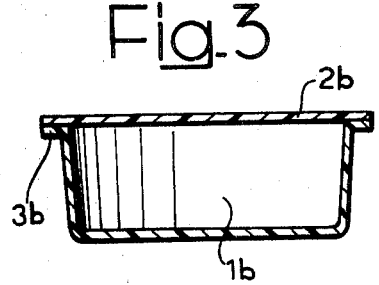
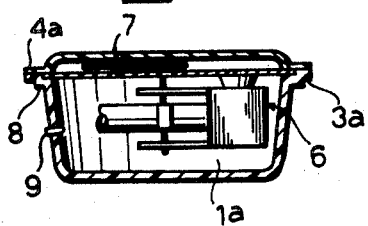
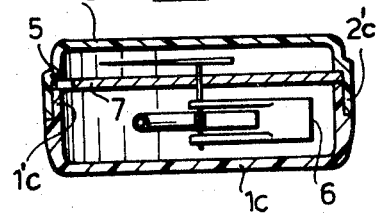

CASING FOR LIQUID-FILLED DEPTH GAUGE

BACKGROUND OF THE INVENTION

The present invention relates to casings for depth-gauges, more particularly depth gauges of the type comprising an hermetically sealed casing, full of liquid, housing a deformable pressure-sensitive member connected to a needle which moves over a graduated scale. The casing has a flexible wall through which the pressure of the ambient fluid to be measured is transmitted to the liquid inside, generally mineral oil, to be detected by the deformable member and indicated by the needle.

Normally the casing of such a depth-gauge consists of a rigid capsule, generally of metal, having a pliable wall formed by an elastic membrane having fluid-tight connections to the walls of the capsule. Such fluid-tight connections are difficult to achieve. The pliable wall of the capsule may be formed by a transparent cover fitted to the capsule to allow the instrument to be read.

Such known instruments present a considerable problem of sealing between various parts of the casing in order to prevent escape of liquid when the instrument is not in use. In practice leakage of liquid is almost inevitable, as very small holes can suffice to allow the escape of oil.

An object of the present invention is to provide a depth gauge avoiding the difficulties mentioned above, having a casing which is hermetically sealed, avoiding any need for restoring the quantity of liquid contained within the casing.

Another object of the invention is the provision of a depth gauge having a sealed casing which is of simple, strong and economical construction and easy and practical to assemble.

SUMMARY OF THE INVENTION

According to the invention there is provided a sealed casing for a liquid-filled depth gauge characterised in that the casing is constituted by a sealed capsule of flexible, transparent, plastics material formed by two elements bonded and sealed together along adjacent peripheral surfaces.

BRIEF DESCRIPTION OF THE DRAWINGS

The invention will now be described, by way of non-limiting example, with reference to the accompanying drawings, wherein:

FIG. 1 is a diagrammatic axial section of a sealed casing for a depth-gauge according to one embodiment of this invention;

FIGS. 2 and 3 are axial sections of depth-gauge casings of two different variants of the embodiment of FIG. 1;

FIG. 4 is an axial section of a depth gauge having a casing according to this invention;

FIG. 5 is an axial section of a variant of the embodiment of FIG. 4;

DETAILED DESCRIPTION OF THE ILLUSTRATED EMBODIMENTS

Figure 6:
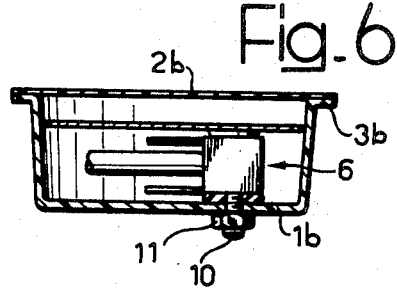
FIG. 6 is an axial section of a casing according to this invention in which a depth gauge instrument has been fixed by means of a screw.

The casing according to this invention for liquid depth-gauges is substantially constituted by a sealed capsule of flexible transparent plastics material formed by two shells fluid-tightly sealed one to the other along their peripheral edges.

By using acrylic or metacrylic resins which can be efficaciously bonded together in a fluid-tight manner by means of solvents which dissolve the parts with which they come into contact, fluid-tight sealing of the two shells can be ensured. In order to open the casing for repair or inspection it is necessary to break the capsule, but this does not constitute a problem in view of the low cost of the capsule.

The plastics capsule thus obtained is not prone to leakage and is impermeable in practical use; moreover, the complete transparency of the component parts of the capsule facilitates checking of the instrument.

The elasticity and flexibility of the walls of the capsule enable the said walls to transmit to the liquid inside the casing the pressure of the surrounding atmosphere, so that the pressure-sensitive parts of the instrument within the casing can measure the said pressure.

In the example illustrated in FIG. 1 the capsule is formed by two identical half-shells 1, 2 provided with peripheral flanges 3, 4 which abut each other and along which the two shells 1, 2 are sealed to each other.

In the variant illustrated in FIG. 2, the capsule comprises a concave shell 1a of greater depth than the shell 1 of FIG. 1, and a shallow slightly concave lid 2a, both provided with peripheral flanges 3a, 4a which are fluid-tightly interconnected.

In the variant of the casing illustrated in FIG. 3 a capsule is formed by a concave dish 1b having a peripheral flange 3b to which a flat lid 2b is fixed and sealed.

According to a further variant illustrated in FIG. 5 the casing has a concave shell 1c having an upstanding cylindrical wall provided with an external rebate around its periphery, forming an edge wall portion 1'c of reduced thickness. The casing has a concave lid 2c formed with an annular cylindrical skirt 2'c having a diameter larger than that of the cylindrical wall portion 1'c of the concave shell 1c so that the skirt 2'c fits over the wall portion 1'c and forms a fluid-tight seal therewith upon assembly of the casing.

The mounting of the instrument in the casing can be carried out in two different ways. In the example illustrated in FIG. 4, a pressure-responsive instrument 6 is located in the deeper shell 1a and attached to a transverse diaphragm 7 which carries a graduated scale and which is sealed between an internal annular shoulder 8 formed on the flange 3a of the shell 1a and the flange 4a of the lid 2a. All the parts of the instrument are suspended within the casing and only the diaphragm 7 is connected to the casing directly. In the variant illustrated in FIG. 5, the diaphragm 7 of the instrument 6 engages in an annular internal groove 5 formed between the peripheral cylindrical wall portion 1'c and the skirt 2'c of the shell 1c and lid 2c respectively.

Alternatively, as illustrated in FIG. 6, the pressure-responsive instrument 6 can be fixed to the bottom of the lower shell 1b by means of a screw-threaded stem 10 which, with an interposed sealing washer, passes through an opening in the bottom wall of the shell 1b, the projecting end of the stem 10 cooperating with an external tightening nut 11. In this embodiment the opening through which the stem 10 passes is used for filling the casing with liquid; in the previously described embodiments, as for example illustrated in FIG. 4, the filling of the casing with liquid can be carried out through a hole in any part of the casing, the hole being subsequently closed tightly by means of a plug 9.

The sealed casing according to the invention can be made in geometrical shapes other than circular ones: for example, the casing viewed in plan may have a square or rectangular shape, or variations of such shapes, since there are no sealing problems of the kind commonly met with in casings of the traditional kind.

Figure 7:
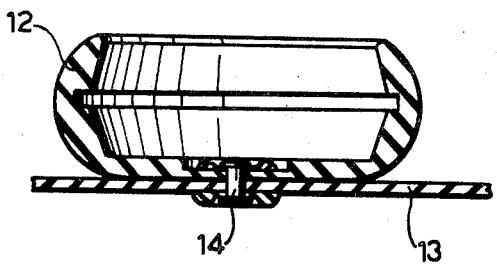
FIG. 7 is an axial section of a support for a sealed casing according to this invention.
Figure 8:
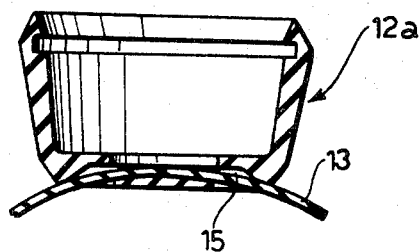
FIGS. 8 and 9 are axial sections of supports illustrating two variations of the support of FIG. 7.

The sealed casings of the type herein described can be inserted in pliable supports, as illustrated in FIGS. 7 and 8. FIG. 7 illustrates a support 12 constituted by a concave body in rubber or the like, adapted to contain a casing of the type illustrated in FIG. 1. The support 12 is elastically deformed to allow the insertion or the removal of the casing and carries a strap 13, fixed to the bottom of the support 12 by means of a small rivet 14. The strap 13 is used to secure the instrument to the user's wrist.

In the example illustrated in FIG. 8 the support 12a is moulded so as to receive casings of the type illustrated in FIGS. 2 to 4: the support 12a has a lower moulded recess 15 in which the fastening strap 13 can be inserted.

Figure 9:
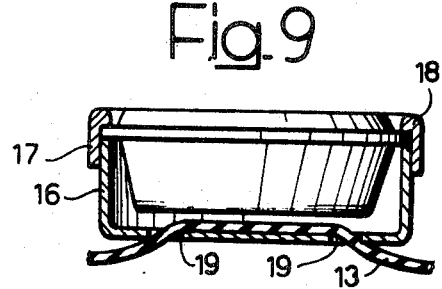

Another form of support is illustrated in FIG. 9, the support in this example being constituted by a hollow metal shell 16 and a metal closure ring 17 which can be screwed on to or force-fitted over the outer surface of the shell 16. The metal ring 17 has an annular internal shoulder 18 which clamps the flanges of the instrument casing against the peripheral edge of the shell 16. Two openings 19 are formed in the bottom of the shell 16 for the through passage of the fastening strap 13.

It is possible to have complete interchangeability between the sealed casings and the pliable supports as herein described, giving a wide range of depth-gauges made up of a reduced number of component elements.

It will be appreciated that, while still keeping to the principle of this invention, the practical embodiments and the manufacturing details thereof can be varied widely from those herein described and illustrated, without nevertheless departing from the scope of this invention.

I claim:

1. A sealed casing for a liquid filled depth gauge comprising a concave shell element of flexible, transparent, plastic material, a transverse flexible plastic cover element for said concave shell element, both of said elements having complementary peripheral edges sealingly engaged with each other, a transverse diaphgram having indicia thereon, means mounting said diaphragm within said peripheral edges of said element of said sealed casing in substantially parallel spaced relation to said transverse element, a pressure responsive instrument, and means for mounting said instrument having indicating means within said casing on said diaphragm.

2. A sealed casing for a liquid filled depth gauge comprising a pair of spaced concave shell elements of flexible, transparent plastic material having complementary peripheral edge portions secured together in fluid tight relation, a transverse diaphragm having scale means interposed and secured between said edges and a pressure responsive instrument having indicating means mounted on said diaphragm for cooperation with said scale means.

3. A sealed casing as set forth in claim 2 wherein said shell elements are each provided with complementary peripheral flanges which are secured together to provide a single protruding flange on said casing.

4. A sealed casing as set forth in claim 3 further comprising molded elasticly pliable support means having a concave configuration adapted to partially surround said sealed casing, said support means having a groove adapted to receive the flange on said sealed casing to secure said sealed casing in said support means and fastening strap means secured to said support means.

5. A sealed casing as set forth in claim 2 wherein the peripheral edge portion of one of said shell elements is fitted within the peripheral edge portion of the other shell element, one of said peripheral edge portions being provided with shoulder means so that said diaphragm is clamped between said shoulder means and the peripheral edge portion of the other shell element.

* * * * *